United States Patent [19]
Gotoh et al.

[11] Patent Number: 5,537,525
[45] Date of Patent: Jul. 16, 1996

[54] COLUMN LAYOUT INFORMATION PROCESSING SYSTEM

[75] Inventors: Shinya Gotoh, Yokohama; Naohiro Hosokawa, Kawasaki, both of Japan

[73] Assignee: Canon Kabushiki Kaisha, Tokyo, Japan

[21] Appl. No.: 334,005

[22] Filed: Nov. 2, 1994

Related U.S. Application Data

[63] Continuation of Ser. No. 701,052, May 16, 1991, abandoned.

[30] Foreign Application Priority Data

Jun. 1, 1990 [JP] Japan .................................... 2-143703

[51] Int. Cl.$^6$ .................................................. G05B 15/00
[52] U.S. Cl. .......................................... 395/148; 395/146
[58] Field of Search ..................................... 395/144, 145, 395/146, 147, 148

[56] References Cited

U.S. PATENT DOCUMENTS 4,984,162  1/1991  Torii et al. ............................... 395/146

OTHER PUBLICATIONS

Word (Trademark of Microsoft Cor.) pp. 5,6,9,260–271, 92, 247–250, 284–285, 276, 330–333, 339, (1988).

Primary Examiner—Mark K. Zimmerman
Assistant Examiner—Cliff N. Vo
Attorney, Agent, or Firm—Fitzpatrick, Cella, Harper & Scinto

[57] ABSTRACT

An information processing apparatus includes a keyboard for inputting data representing information to be processed and for inputting data representing tab information including the location of tabs between two margins, a memory for storing the data representing the tab information inputted by the keyboard, and a central processing unit. The central processing unit defines areas in which the inputted data representing the information to be processed is to be located according to the inputted data representing the location of the tabs between the margins. The central processing unit also assigns an identification mark to each of the defined areas. In addition, the central processing unit specifies an area identified by an identification mark and processes information in the specified area.

31 Claims, 9 Drawing Sheets

F I G. 1
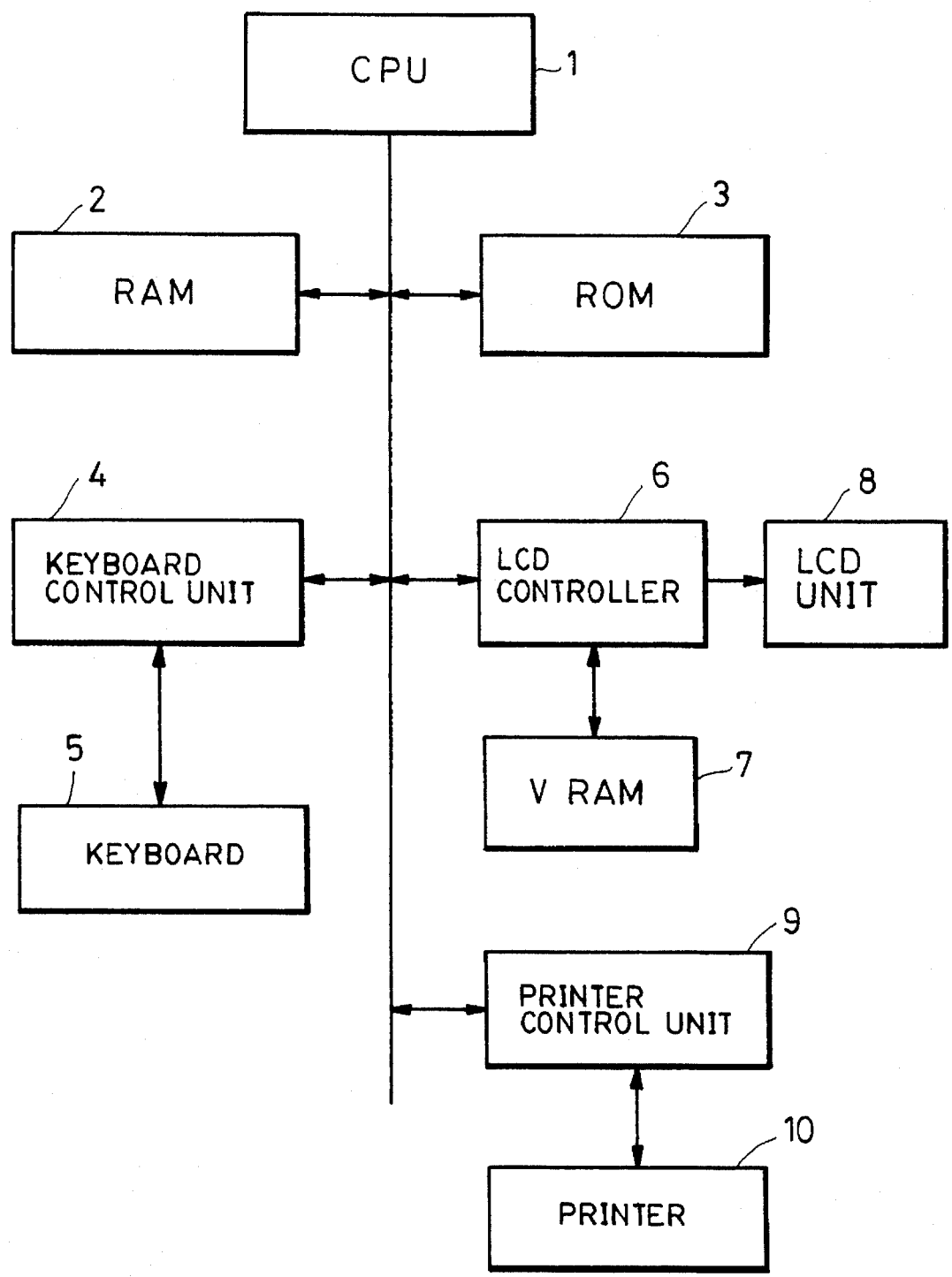

FIG. 5

```
     COLUMN
1  Copy column
2  Move column
3  Delete column
4  Sort column
```

FIG. 6

■ Copy column From[ ] to [ ]

FIG. 7

| Memberships | 1988 | 1989 |
|---|---|---|
| Kentucky | 80 | 110 |
| California | 240 | 280 |
| Wisconsin | 10 | 18 |
| Nebraska | 130 | 145 |
| Arizona | 120 | 135 |

FIG. 8

| Memberships | 1988 | 1988 | 1989 |
|---|---|---|---|
| Kentucky | 80 | 80 | 110 |
| California | 240 | 240 | 280 |
| Wisconsin | 10 | 10 | 18 |
| Nebraska | 130 | 130 | 145 |
| Arizona | 120 | 120 | 135 |

COLUMN LAYOUT INFORMATION PROCESSING SYSTEM

This application is a continuation of application Ser. No. 07/701,052 filed May 16, 1991, now abandoned.

BACKGROUND OF THE INVENTION

1. Field of the Invention

The present invention relates to a document processing apparatus that processes input document information, and more particularly, to a document processing apparatus on a display screen of which input character string control information, such as margins, tabs, or decimal tabs, are displayed.

2. Description of the Related Art

Up until now, in the above-mentioned type apparatus, e.g., electronic typewriters, input character string control commands, such as tabs or decimal tabs, have been used to perform a cursor movement function and alignment of input character strings accurately and easily at the time of document input processing.

FIG. 12 shows a text display screen displayed on a liquid crystal device (LCD) unit of the prior art. In FIG. 12, reference numeral 11 denotes the entire display which consists of a format information display area 12 and a text display area 13. Displayed in the format information display area 12 are a left margin 14 that indicates the leftmost position of input document data, tabs 15 that indicate the start point of a specific input character string, a decimal tab 16 that indicates the alignment of numeric values of the specific input character string, and a right margin 17 that indicates the rightmost position of the input document data.

FIG. 13 is a flowchart of a format setting operation according to the prior art.

S1: Enter a format setting mode or routine as a result of the selection of a format setting key in a document processing apparatus.

S2: Read the format setting key and discriminate the setting data.

S3: Read the cursor position which is currently set in order to determine the position at which the format setting data is input.

S4: Display commands, such as tabs, in the format information display area 12 at the position at which the cursor is positioned on the basis of the input format setting data.

S5: Write format data in a work area of a random access memory (RAM) for format data used as a work area to which access is made at any time in the course of preparing a document.

SUMMARY OF THE INVENTION

It is an object of the present invention to overcome the problems of the prior art.

It is another object of the present invention to provide an information processing apparatus that uses tabs and decimal tabs not only to perform a cursor movement function and to align input character strings, but also to automatically define columns in which an inputted text is to be displayed and printed.

According to one aspect, the present invention which achieves these objectives relates to an information processing apparatus, comprising inputting means for inputting data representing information to be processed and for inputting data representing tab information including the location of tabs between two margins, tab storing means for storing the data representing the tab information inputted by the inputting means, defining means for defining areas in which the inputted data representing the information to be processed is to be located according to the inputted data representing the location of the tabs between the margins, assigning means for assigning an identification mark to each of the defined areas defined by the defining means, and processing means for specifying an area identified by an identification mark assigned by the assigning means and for processing information in the specified area.

The apparatus also comprises identification mark storing means for storing data representing identification marks assigned by the assigning means, and means for storing the data representing the information to be processed.

In addition, the apparatus comprises displaying means for displaying the inputted data representing the information to be processed, displaying means for displaying the inputted data representing the information to be processed and representing the tab information, display means for displaying the inputted data representing the tab information stored in the tab storing means, and means for displaying the identification marks and for preventing display of the data representing the tabs in response to the assigning means for assigning identification marks to the defined areas. The processing means comprises copying means for copying the inputted data representing the information to be processed, and inputting means comprises means for defining areas on the basis of the inputted data representing the tab information.

According to another aspect, the present invention which achieves these objectives relates to an information processing method, comprising the steps of inputting data into an information processing apparatus representing tab information including the location of tabs between two margins and representing information to be processed, storing the data representing the tab information inputted in the inputting step, defining areas in which the inputted information to be processed is to be located on the basis of inputted data representing the location of the tabs between the two margins, assigning an identification mark to each defined area, and specifying an area identified by an identification mark assigned in the assigning step and processing the information in the specified area.

According to still another aspect, the present invention which achieves these objectives relates to an information processing apparatus, comprising inputting means for inputting data representing tab information including the location of tabs between two margins, tab storing means for storing the data representing the tab information inputted by the inputting means, defining means for defining areas in which the inputted data representing characters is to be located on the basis of the location of the tabs between the two margins, assigning means for assigning an identification mark for each area defined by the defining means, displaying means for displaying the characters inputted by the input means and for displaying the identification marks assigned by the assigning means, and processing means for specifying an area identified by an identification mark assigned by the assigning means and for processing data representing characters inputted by the inputting means in the specified area.

This apparatus further comprises identification mark storing means for storing identification marks assigned by the assigning means, and means for storing the data representing the characters to be processed.

This apparatus also comprises means for displaying the inputted data representing the characters to be processed, and means for displaying the identification marks and for preventing display of the data representing the tabs in response to the assigning means assigning identification marks to the defined areas. In this embodiment the processing means comprises copying means for copying the inputted data representing the characters to be processed, and the inputting means comprises means for defining areas on the basis of the inputted data representing the tab information.

According to another aspect, the present invention which achieves these objectives relates to an information processing apparatus, comprising inputting means for inputting data representing characters to be processed and data representing tab information and decimal tab information including the location of tabs and decimal tabs between two margins, tab storing means for storing the data representing tab information and decimal tab information inputted by the inputting means, defining means for defining areas in which the inputted data representing characters is to be located on the basis of the location of the tabs and decimal tabs between the margins, assigning means for assigning an identification mark for each area defined by the defining means, displaying means for displaying the identification marks, the tabs, and the decimal tabs, and processing means for specifying an area identified by an identification mark assigned by the assigning means and for processing data representing characters inputted by the input means in the specified area.

In this embodiment the apparatus further comprises identification mark storing means, means for storing the data representing the characters to be processed, and means for displaying the identification marks and for preventing display of the data representing the tabs in response to the assigning means assigning identification marks to the defined areas. In addition, the processing means comprises copying means for copying the input data representing the characters to be processed, and the inputting means comprises means for defining areas on the basis of the inputted data representing the tab information.

According to another aspect, the present invention which achieves these objectives relates to an information processing apparatus, comprising inputting means for inputting data representing characters to be processed, numeric data, and data representing tab information including the location of tabs between two margins, tab storing means for storing the data representing the tab information, defining means for defining areas in which the inputted data representing characters is to be located on the basis of the location of the tabs between the margins, assigning means for assigning an identification mark for each area defined by the defining means, displaying means for displaying the identification marks and the tabs, and processing means for specifying an area identified by an identification mark assigned by the assigning means and for processing characters inputted by the input means in the specified area.

In this embodiment the apparatus also comprises identification mark storing means for storing identification marks assigned by the assigning means, and means for storing the data representing the characters to be processed, and means for preventing display of the data representing the tabs in response to the assigning means assigning identification marks to the defined areas. In addition, the processing means comprises copying means for copying the input data representing the characters to be processed, and the inputting means comprises means for defining areas on the basis of the inputted data representing the tab information.

According to still another aspect, the present invention which achieves these objectives relates to an information processing method, comprising the steps of inputting data into an information processing apparatus representing tab information including the location of tabs between two margins, storing the data representing the tab information inputted in the inputting step, defining areas in which information to be processed is to be located on the basis of inputted data representing the location of the tabs between the two margins, assigning an identification mark to each defined area, and specifying an area identified by an identification mark assigned in the assigning step and processing the information to be processed in the specified area.

According to yet another aspect, the present invention which achieves these objectives relates to an information processing apparatus, comprising inputting means for inputting data representing characters to be processed, numeric data, and data representing tab information including the location of tabs between two margins, tab storing means for storing the data representing the tab information, defining means for defining area in which the inputted numeric data is to be located on the basis of the location of the tabs between the margins, assigning means for assigning an identification mark for each area defined by the defining means, displaying means for displaying an identification mark assigned to an area by the assigning means, and processing means for specifying an area identified by the assigning means and for processing the numeric data inputted by the input means in the specified area.

These and other objects, features and advantages of the present invention will become clear when reference is made to the following detailed description of the preferred embodiments of the present invention, together with reference to the accompanying drawings.

BRIEF DESCRIPTION OF THE DRAWINGS

FIG. 1 is a block diagram of a typewriter of an embodiment of the present invention;

FIG. 5 is a view showing a menu screen in a column processing mode;

FIG. 6 is a view showing a menu screen in a column copy processing mode;

FIG. 7 is a view showing a text display screen before a column copy operation is performed;

FIG. 8 is a view showing a text display screen after the column copy operation is performed;

DESCRIPTION OF THE PREFERRED EMBODIMENTS

Figure 2:
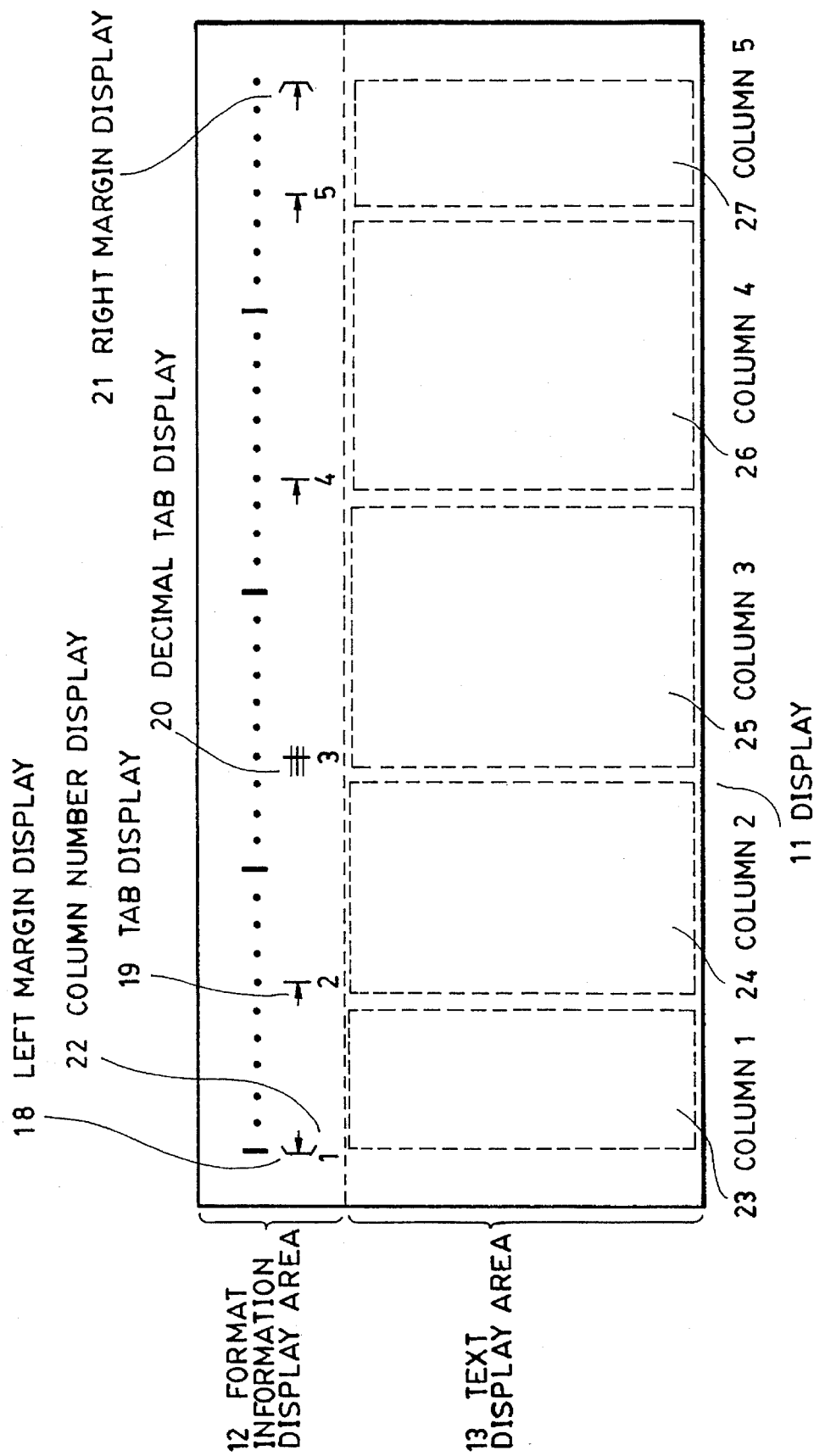
FIG. 2 is a schematic view showing a text display screen in the present invention.

Various embodiments of the present invention will be explained hereinbelow with reference to the accompanying drawings. FIG. 1 is a block diagram of an embodiment of a typewriter of the present invention. In FIG. 1, reference numeral 1 denotes a CPU (Central Processing Unit) that centrally controls this typewriter on the basis of the control procedures stored in a memory, information from input means, or internal status information, all of which will be described later. Reference numeral 2 denotes a memory RAM (random access memory) containing an area TEXT in which data representing documents prepared by a typewriter are stored, an area TR in which data representing tabs and decimal tabs are stored, an area REG in which data during processing is stored, a cursor register CR, a format information storage area FR, or an area IB in which input information is stored. Reference numeral 3 denotes a memory ROM (read only memory) in which character font data and programs of control procedures shown in FIGS. 3 and 4 which are executed by the CPU 1 are stored. Reference numeral 4 denotes a keyboard control unit that controls key data input from a keyboard and communicates it to the CPU 1. Reference numeral 5 denotes a keyboard which includes alphabet keys, numeric value keys, a tab key, a decimal tab key, a left margin key, a tab set key, a tab reset key, a decimal tab set key, a decimal tab reset key, cursor keys, a return key, a column function selection key, etc. As a result, the keyboard 5 inputs data representing information such as characters or numerals to be processed, and decimal information including the location of tabs and decimal tabs between left and right margins. Reference numeral 6 denotes a liquid crystal device (LCD) controller that outputs the contents of a picture image memory to a display unit; reference numeral 7 denotes a bit-mapped picture-image memory (VRAM) in which a document stored in the memory 2 is converted to a picture image by the CPU 1 and is written; reference numeral 8 denotes a liquid crystal device (LCD) unit on which the contents of the picture-image memory 7 are displayed by means of the controller 6; reference numeral 9 denotes a printer controller unit that outputs the document of the memory 2 to a printer so it will be printed; and reference numeral 10 denotes a printer which may be an ink jet recording type, a thermal transfer recording type, an electrostatic recording type, or an impact recording type printer.

FIG. 2 shows a text display screen of the present embodiment. In FIG. 2, reference numeral 18 denotes a left margin symbol; 19 denotes a tab symbol; 20 denotes a decimal tab symbol; and 21 denotes a right margin symbol. The CPU 1 assigns identification marks, such as column numbers 22 to columns defined by the CPU 1 under each tab symbol 19 and decimal tab symbol 20. These column numbers 22 are automatically set by the CPU 1 and are caused to be displayed on the LCD unit 8 in a character string which is created when the tab symbol 19 and the decimal tab symbol 20 are set. The tab symbol 19 and the decimal tab symbol 20 are set by the CPU 1 in response to the operator depressing the tab key and the decimal tab set key.

The CPU 1 defines columns of inputted characters and numerals on the basis of the data inputted by the keyboard 5 representing the location of tabs between the inputted margins, as will be discussed in more detail below. The operator can input characters and numerals into a particular column and the operator can edit characters and numerals in a particular column by depressing keys or a key indicating that editing or inputting characters and/or numerals into a column is to be performed and by depressing the corresponding numeric value key corresponding to the column to be worked on. Alternatively, if displayed characters and/or numerals are not in columns, they can be placed into columns by the CPU 1 automatically by setting tabs and/or decimal tabs. In addition, the operator can copy, move, delete and sort any column by depressing a key or keys instructing the CPU 1 to perform the appropriate column processing routine. In response to depressing the keys noted above, the CPU 1 specifies the chosen column or columns and processes information or performs operations on the specified column or columns.

Regarding the column numbers 22, these numbers are determined in sequence from the left, in a character string which is created by the setting of the left margin symbol 18, the tab symbol 19, and the decimal tab symbol 20, and the numbers are then displayed. Column areas which are defined according to the tabs and margins are displayed in column areas in the text screen. When margins and decimal tabs are set in FIG. 3, column 1 of a column area 23, column 2 of a column area 24, column 3 of a column area 25, column 4 of a column area 26, and column 5 of a column area 27 are determined automatically by the CPU 1. Column numbers 22 that identify each column area are automatically displayed in the format information display area 12.

The operation of the arrangement described above will now be explained.

Figure 3:
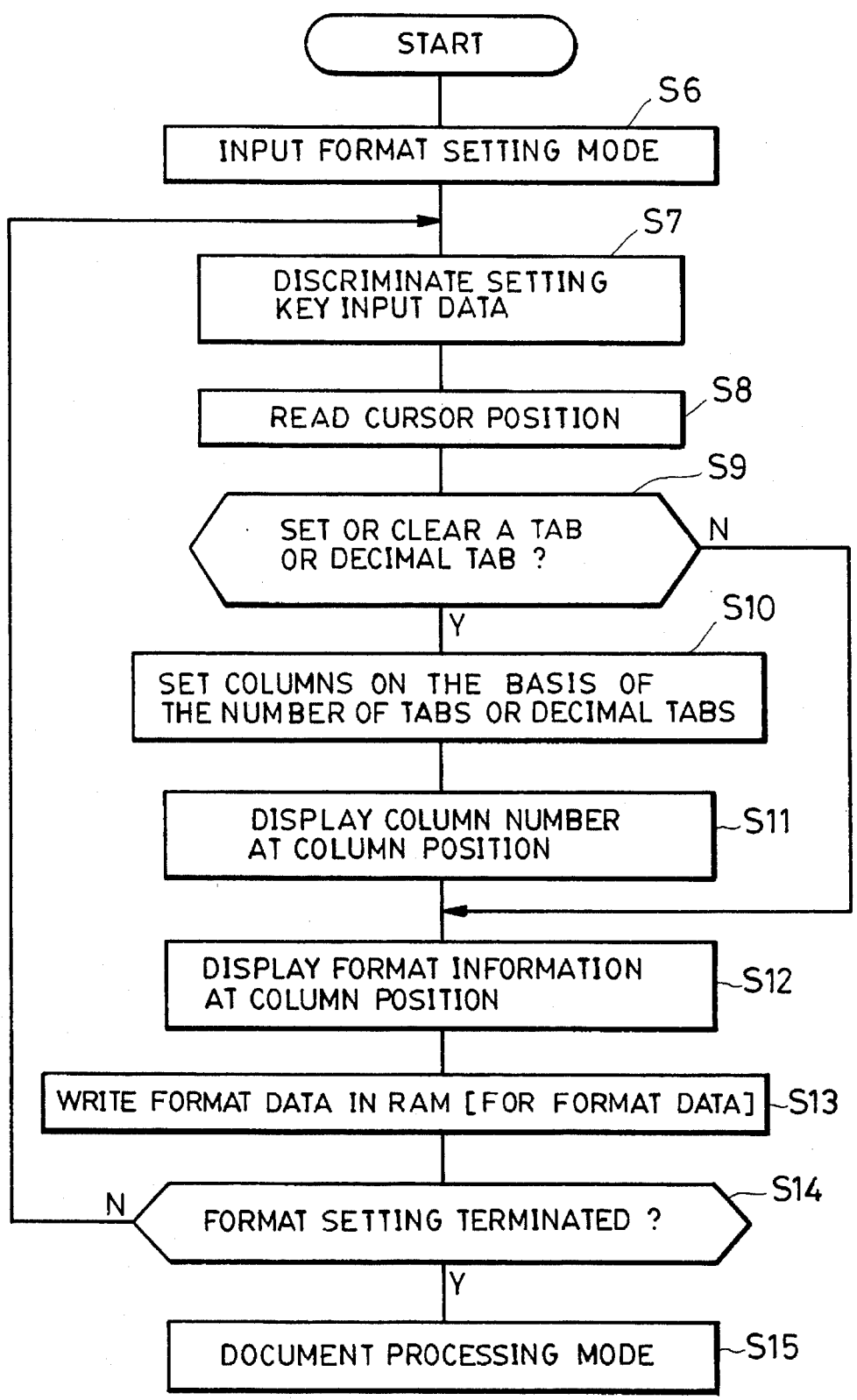
FIG. 3 is a flowchart of a format setting routine of the present invention.

FIG. 3 is a flowchart showing a format setting routine of the present invention. The sequence of operations in this flowchart is executed by CPU reading the content of ROM as follows:

S6: The operator depresses a format setting key, such as a tab key or a decimal tab key, which enters data instructing the CPU 1 to perform a format setting routine during a process for processing a document and stores data representing the selected format setting mode in area IB of S7: The CPU 1 reads the data representing the format setting mode input via the keyboard 5 from the area IB and discriminates the set data.

S8: The CPU 1 reads the position of the currently set cursor in the register CR in a RAM 2 in order to determine the position at which the format set data is input.

S9: CPU 1 checks whether the format setting key determined in step S7 is a tab set or a tab clear key, or a decimal tab set or a decimal clear key, on the basis of key data codes.

S10: In the case of "yes" in step S9, the CPU 1 updates the tab or decimal tab information of area TR, clears column information created by the tab or decimal tab information, and recreates the column information as follows. Columns are defined by the CPU 1 as follows: an area from the left margin 18 to the next tab or decimal tab area is defined as column 1, an area from the rightmost position of column 1 to the next tab or decimal tab area is defined as column 2, and so on. This information is stored by the CPU 1 in the area REG of the memory RAM 2.

S11: Numbers are assigned by the CPU 1 to the columns defined in step S10 in order and starting from the column nearest to the left margin. To display column numbers at the column position of the format information display area as shown in FIG. 2, the CPU 1 writes column numbers at the corresponding position of the memory 7.

S12: The CPU 1 stores data representing decimal tab symbols or tab symbols at the corresponding position of the memory 7 in order to display corresponding commands—format setting information input in step S7, which are decimal tabs or tabs in this embodiment, at the display position where the cursor is positioned. The CPU 1 also then displays the decimal tab symbols or tab symbols at the display position where the cursor is positioned.

S13: The CPU 1 writes format data in the area FR in the RAM 2. Area FR in the RAM 2 is used as a work area, to which access is made at any time to access format information, in the course of preparing a document.

S14: The CPU 1 reads from area IB of RAM 2 data representing the format setting routine input via the keyboard 5 and determines whether format setting has been finished. In the case of "yes", the process is terminated; in the case of "no", the process returns to step S7 and the above-described operations are repeated.

S15: Return to the normal document processing mode after format setting is finished in step S14.

As has been explained above, when format setting keys are depressed to input format setting mode data at the time of format setting, columns are automatically set.

Figure 4:
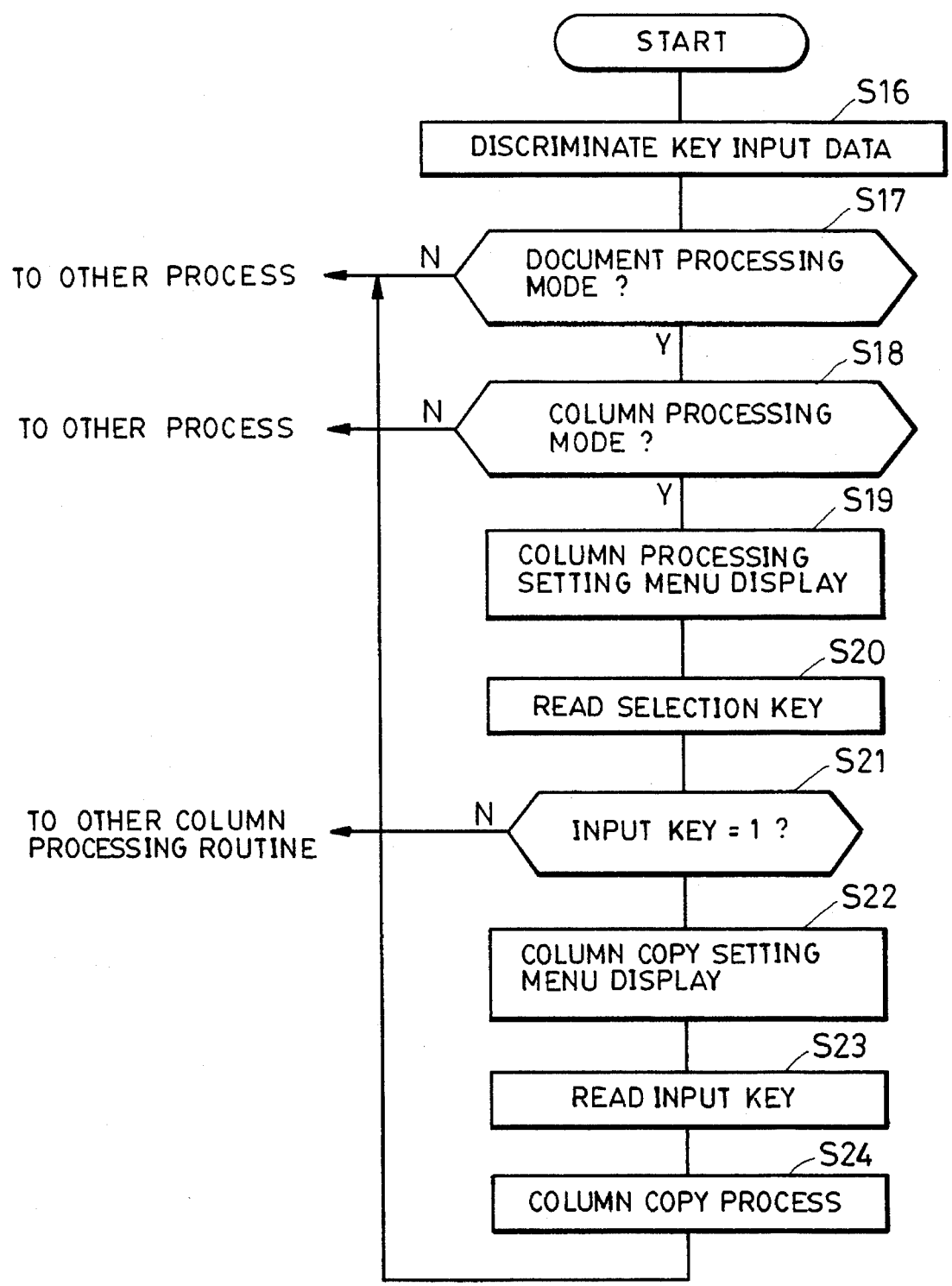
FIG. 4 is a flowchart of a column copy operation.

FIG. 4 shows the sequence of control, in which a document is processed specifically as an example according to format information which has been set. The process in FIG. 4 shows column copying among the editing processes for columns in a text.

The operation of each of the steps in FIG. 4 will be explained below.

S16: The CPU 1 discriminates data input via the keyboard 5 by an operator.

S17: The CPU 1 determines whether or not the input data is data for normal document processing. When it is not, the process proceeds to other steps such as format setting or document data storage.

S18: The CPU 1 determines whether or not the input document processing data is data for branching to a column processing routine. When it is not, the process branches to another document processing routine; when it is, the process branches to a column processing routine.

S19: The CPU 1 sends data representing a column processing setting menu to the VRAM 7 in order to display a column processing setting menu from which an operator selects the type of column processing to be performed in the column processing routine. The menu is displayed on the LCD unit 8.

The menu to be displayed for the operator in step S19 is shown in FIG. 5.

S20: The CPU 1 reads key data input via the keyboard 5 (e.g., numeric keys 1, 2, 3, or 4) by the operator from the choices displayed in the menu in step S19.

S21: It is determined whether or not the value of the input numeric data is 1. When it is not 1, the process branches to a process routine, such as column movement, column delete, or column sort, which is indicated by the input numeric data.

S22: When the numeral 1 is input, which corresponds to the column copy setting menu, the CPU 1 writes the menu shown in FIG. 6 in the memory 7 in order to display the column copy processing setting menu for column copying on the LCD 8. The menu to be displayed for the operator in step S22 is shown in FIG. 6.

S23: The operator enters at two places on the screen shown in FIG. 6 via keyboard 5 the column number to be copied and the destination column number to which the copied column is to be moved. The CPU 1 reads in the input numeric data.

S24: The CPU 1 copies columns in a text area TEXT in RAM 2 according to the data input in step S23 and writes the result of the copying in the memory 7.

FIG. 7 shows one example of a document processing screen of the LCD 8 before copying is performed. In this one example of column copy processing, it is specified that column 3 be copied to column 4. The result of the processing in shown in the document processing screen in FIG. 8. In this example, the contents of column 4 are shifted to the right, and the copied column is inserted between column 3 and column 5.

The above steps comprise the procedure for column copy processing. In this embodiment, a boundary between column present invention 2 and 3 is discriminated by space between character strings.

(Second Embodiment)

Figure 9:
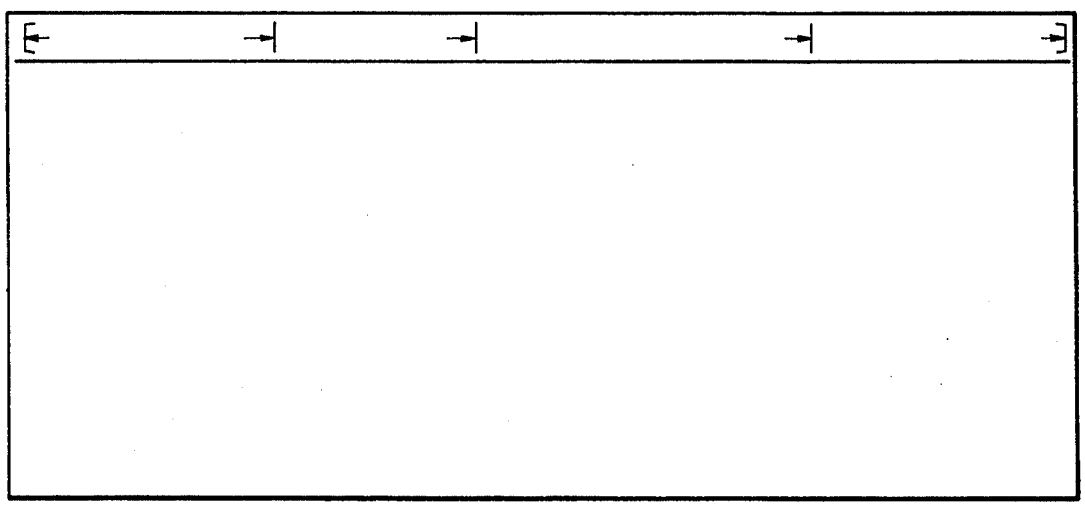
FIG. 9 is a view showing a normal document processing screen in a second embodiment.
Figure 10:
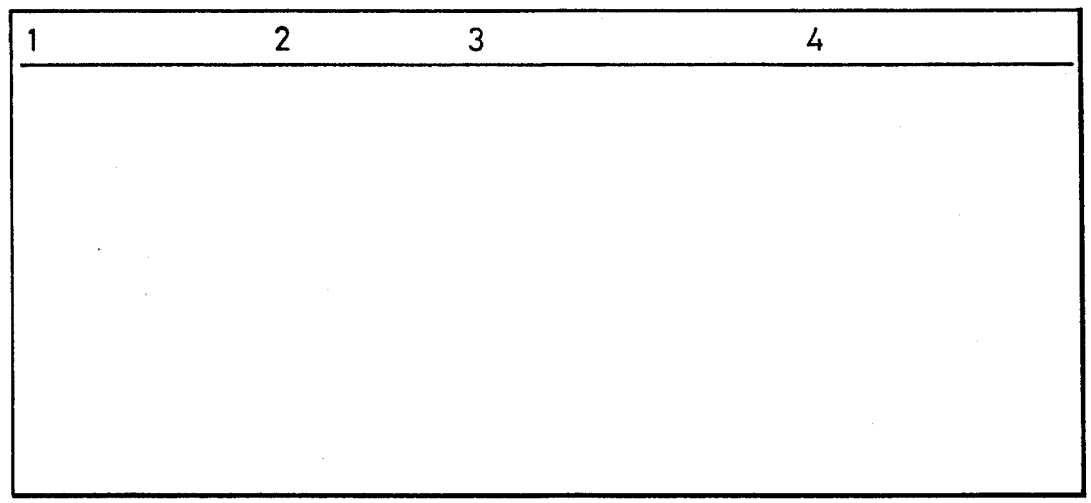
FIG. 10 is a view showing a display screen in a column processing mode in a second embodiment.
Figure 11:
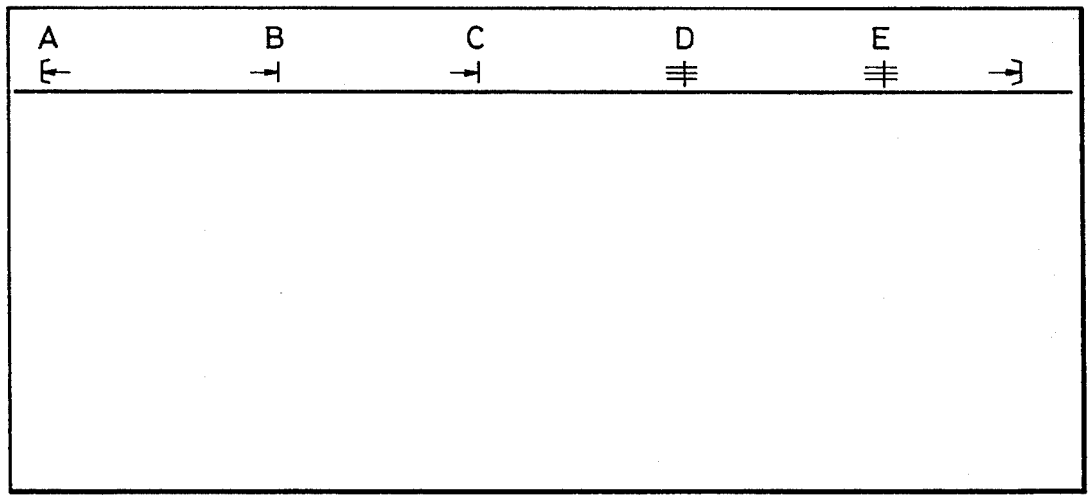
FIG. 11 is a view showing a document processing screen in a third embodiment.
Figure 12:
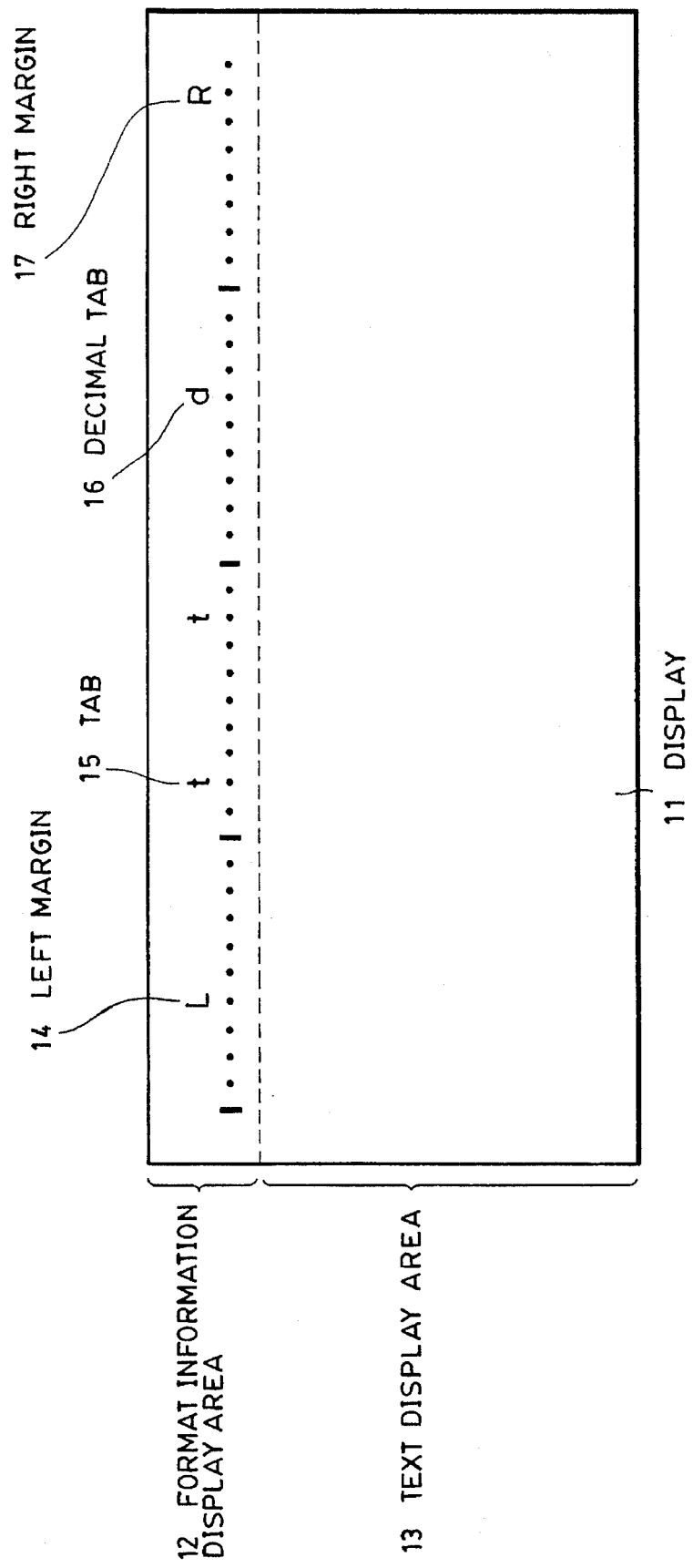
FIG. 12 is a view showing a text display screen in the prior art.
Figure 13:
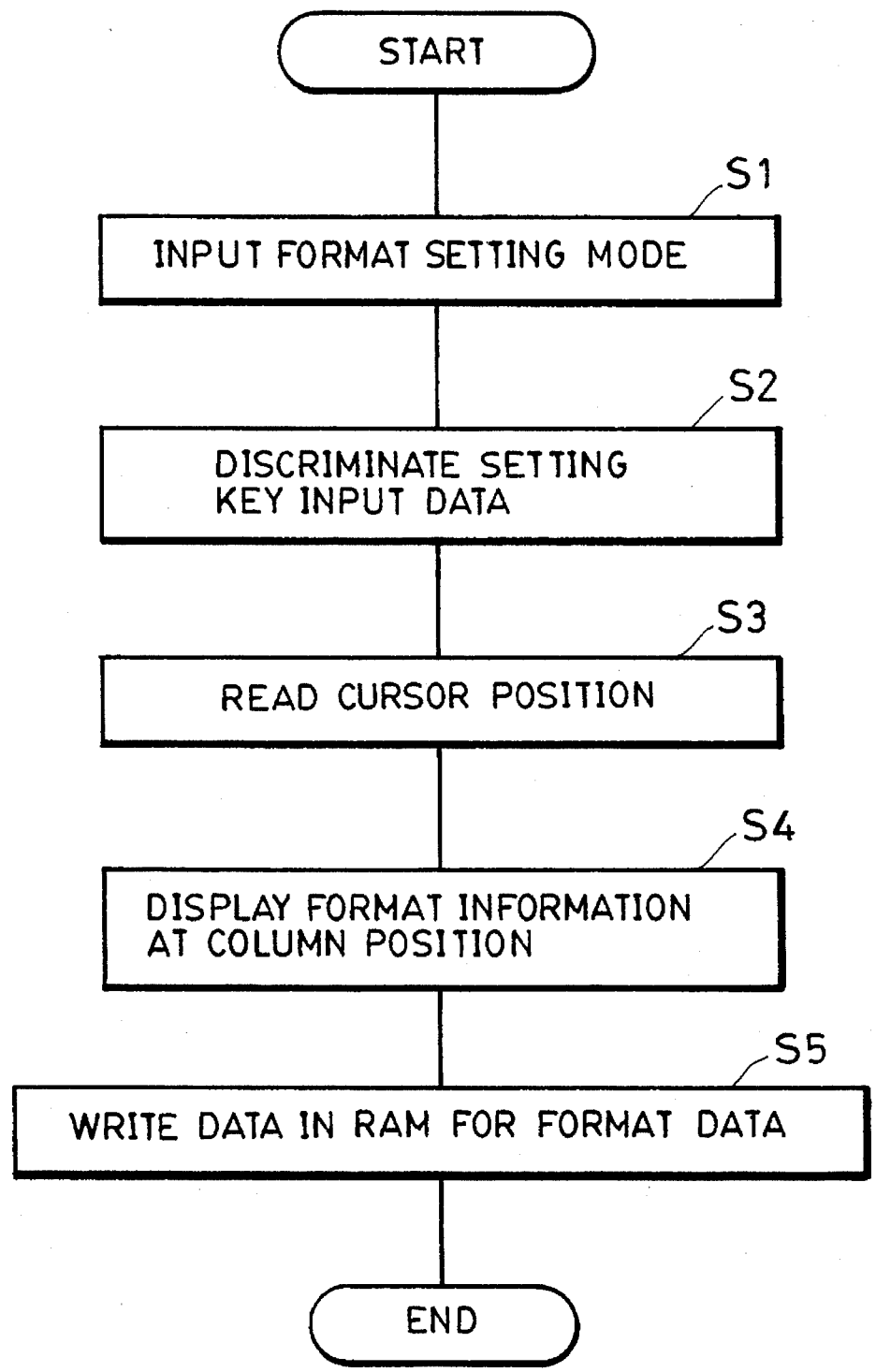
FIG. 13 is a flowchart of a format setting routine in the prior art.

In this second embodiment the display of the format information display area 12 is changed with respect to the text display screen in embodiment 1. All other parts are the same as those in embodiment 1. Hence, an explanation thereof is omitted. This embodiment is adapted for use with a small display screen. In this embodiment the format information display area is made smaller during format setting by omitting the display of column numbers, thereby omitting step S11 in FIG. 3. In addition, columns are not displayed at all times, as in the first embodiment. In the document processing mode, tab display or decimal tab display of the format information area is the same as in the first embodiment, as shown in FIG. 9, until the process proceeds to the column processing mode. In the column processing mode in this second embodiment, column numbers are displayed, as shown in FIG. 10. This is accomplished by inserting step S11 from the first embodiment after step S18 of FIG. 4. Since discrimination between the tab or decimal tab need not be performed in the column processing mode, tab symbols and decimal symbols are not displayed when during column processing in the second embodiment, and therefore, the format information area can be made shorter than in embodiment 1. Thus, an effective use of display is made possible.

(Third Embodiment)

In the third embodiment the display of the format information area 12 is changed in contrast to the text display screen in embodiment 1. Other parts are the same as those in embodiment 1. Hence, an explanation thereof is omitted.

Embodiment 3 is the same as embodiment 1, except that column letters rather than column numbers are displayed. Moreover, the column letters are alphabetically. As a result, where the number of set tabs or set decimal tabs increases as the printing document becomes larger, a column can be specified by one key input and document processing can be performed faster in the alphabet display.

It should be noted that columns may be identified by different colors or brightnesses.

The individual components represented by the blocks shown in FIG. 1 are well known in the document processing art and their specific construction and operation is not critical to the invention or the best mode for carrying out the invention. Moreover, the operations illustrated in FIGS. 3 and 4 can be easily programmed into well known central processing units by persons of ordinary skill in the art and since such programming per set is not part of the invention, no further description thereof is deemed necessary.

Many different embodiments of the present invention can be made without departing from the spirit and scope thereof; therefore, it is to be understood that this invention is not limited to the specific embodiments described above and is solely defined in the appended claims.

What is claimed is:

1. An information processing apparatus, comprising:

inputting means for inputting processable data representing information to be processed and for inputting tab data representing tab information including a location of tabs between two margins;

tab storing means for storing the tab data inputted by said inputting means;

defining means for automatically defining columns between the tabs represented by the tab data into which the processable data is placed or in which the processable data is edited in response to only depressing an element indicating the inputting or editing of data in a column is to be performed and depressing an element indicating the column to be edited or into which the processable data is to be input;

assigning means for assigning an identification mark to each of the defined columns defined by said defining means; and processing means for specifying a column identified by an identification mark assigned by said assigning means and for processing information in the specified column in response to only depressing the element indicating the inputting or editing of data in a column is to be performed and depressing an element indicating the column to be edited or into which the processable data is to be input.

2. The information processing apparatus according to claim 1, further comprising identification mark storing means for storing data representing identification marks assigned by said assigning means.

3. The information processing apparatus according to claim 1, further comprising means for storing the data representing the information to be processed.

4. The information processing apparatus according to claim 1, further comprising displaying means for displaying the inputted data representing the information to be processed.

5. The information processing apparatus according to claim 1, wherein said processing means comprises copying means for copying the inputted data representing the information to be processed.

6. The information processing apparatus according to claim 1, further comprising displaying means for displaying the inputted data representing the information to be processed and representing the tab information.

7. The information processing apparatus according to claim 1, wherein said inputting means comprises means for defining columns on a basis of the inputted data representing the tab information.

8. The information processing apparatus according to claim 1, further comprising means for displaying the inputted data representing the tab information stored in said tab storing means.

9. The information processing apparatus according to claim 1, further comprising means for displaying the identification marks and for preventing display of the data representing the tabs in response to said assigning means assigning identification marks to the defined columns.

10. An information processing method, comprising the steps of:

inputting tab data into an information processing apparatus representing information including a location of tabs between two margins and processable data representing information to be processed;

storing the tab data representing the tab information inputted in said inputting step;

defining columns between the tabs represented by the tab data into which the processable data is placed or in which the processable data is edited in response to depressing an element indicating the inputting or editing of data in a column is to be performed and depressing an element indicating the column to be edited or into which the processable data is to be input;

assigning an identification mark to each of the defined columns; and specifying a column identified by an identification mark assigned in said assigning step and copying the information in the specified column in response to depressing the element indicating the inputting or editing of data in a column is to be performed and depressing an element indicating the column to be edited or into which the character data is to be input.

11. An information processing apparatus, comprising:

inputting means for inputting character data representing characters to be processed and tab data representing tab information including a location of tabs between two margins;

tab storing means for storing the tab data representing the tab information inputted by said inputting means;

defining means for defining columns between the tabs represented by the tab data into which the character data is placed or in which the character data is edited in response to only depressing an element indicating the inputting or editing of character data in a column is to be performed and depressing an element indicating the column to be edited or into which the character data is to be input;

assigning means for assigning an identification mark to each column defined by said defining means;

displaying means for displaying the characters inputted by said input means and for displaying the identification marks assigned by said assigning means; and processing means for specifying a column identified by an identification mark assigned by said assigning means and for processing data representing characters inputted by said inputting means in the specified column in response to only depressing the element indicating the inputting or editing of character data in a column is to be performed and depressing an element indicating the column to be edited or into which the character data is to be input.

12. The information processing apparatus according to claim 11, further comprising identification mark storing means for storing identification marks assigned by said assigning means.

13. The information processing apparatus according to claim 11, further comprising means for storing the data representing the characters to be processed.

14. The information processing apparatus according to claim 11, further comprising means for displaying the inputted data representing the characters to be processed.

15. The information processing apparatus according to claim 11, wherein said processing means comprises copying means for copying the inputted data representing the characters to be processed.

16. The information processing apparatus according to claim 11, wherein said inputting means comprises means for defining columns on the basis of the inputted tab data representing the tab information.

17. The information processing apparatus according to claim 11, further comprising means for displaying identification marks and for preventing display of the tab data representing the tabs in response to said assigning means assigning identification marks to the defined areas.

18. An information processing apparatus, comprising:

inputting means for inputting character data representing characters to be processed and tab data representing tab information and decimal tab information including a location of tabs and decimal tabs between two margins;

tab storing means for storing the tab data representing tab information and decimal tab information inputted by said inputting means;

defining means for defining columns between the tabs represented by the tab data into which the character data is placed or in which the character data is edited in response to only depressing an element indicating the inputting or editing of character data in a column is to be performed and depressing an element indicating the column to be edited or into which the character data is to be input;

assigning means for assigning an identification mark for each column defined by said defining means;

displaying means for displaying the identification marks, the tabs, and the decimal tabs; and processing means for specifying a column identified by an identification mark assigned by said assigning means and for processing data representing characters inputted by said input means in the specified column in response to only depressing the element indicating the inputting or editing of data in a column is to be performed and depressing an element indicating the column to be edited or into which the character data is to be input.

19. The information processing apparatus according to claim 18, further comprising identification mark storing means for storing identification marks assigned by said assigning means.

20. The information processing apparatus according to claim 18, further comprising means for storing the data representing the characters to be processed.

21. The information processing apparatus according to claim 18, wherein said processing means comprises copying means for copying the input data representing the characters to be processed.

22. The information processing apparatus according to claim 18, wherein said inputting means comprises means for defining columns on the basis of the inputted data representing the tab information.

23. The information processing apparatus according to claim 18, further comprising means for displaying identification marks and for preventing display of the data representing the tabs in response to said assigning means assigning identification marks to the defined columns.

24. An information processing apparatus, comprising:

inputting means for inputting character data representing characters to be processed, numeric data, and tab data representing tab information including a location of tabs between two margins;

tab storing means for storing the tab data representing tab information;

defining means for defining columns between the tabs represented by the tab data into which the character data is placed or in which the character data is edited in response to depressing an element indicating the inputting or editing of data in a column is to be performed and depressing an element indicating the column to be edited or into which the character data is to be input;

assigning means for assigning an identification mark for each column defined by said defining means;

displaying means for displaying the identification marks and the tabs; and processing means for specifying a column identified by an identification mark assigned by said assigning means and for copying characters inputted by said input means in the specified column in response to depressing the element indicating the inputting or editing of data in a column is to be performed and depressing an element indicating the column to be edited or into which the character data is to be input.

25. The information processing apparatus according to claim 24, further comprising identification mark storing means for storing identification marks assigned by said assigning means.

26. The information processing apparatus according to claim 24, further comprising means for storing the data representing the characters to be processed.

27. The information processing apparatus according to claim 24, wherein said processing means comprises copying means for copying the input data representing the characters to be processed.

28. The information processing apparatus according to claim 24, wherein said inputting means comprises means for defining columns on the basis of the inputted data representing the tab information.

29. The information processing apparatus according to claim 24, further comprising means for displaying the identification marks and for preventing display of the data representing the tabs in response to said assigning means assigning identification marks to the defined columns.

30. An information processing method, comprising the steps of:

inputting tab data into an information processing apparatus representing tab information including a location of tabs between two margins;

storing the data representing the tab information inputted in said inputting step;

defining columns between the tabs represented by the tab data into which processable data is placed or in which processable data is edited in response to depressing an element indicating the inputting or editing of data in a column is to be performed and depressing an element indicating the column to be edited or into which the processable data is to be input;

assigning an identification mark to each defined column; and specifying a column identified by an identification mark assigned in said assigning step and copying the processable data in the specified column in response to depressing an element indicating the inputting or editing of data in a column is to be performed and depressing an element indicating the column to be edited or into which the processable data is to be input.

31. An information processing apparatus, comprising:

inputting means for inputting character data representing characters to be processed, numeric data, and tab data representing tab information including a location of tabs between two margins;

tab storing means for storing the tab data representing the tab information;

defining means for defining columns between the tabs represented by the tab data into which the character and/or numeric data is placed or in which character and/or numeric data is edited in response to depressing an element indicating the inputting or editing of data in a column is to be performed and depressing an element indicating the column to be edited or into which data is to be input;

assigning means for assigning an identification mark for each column defined by said defining means;

display means for displaying an identification mark assigned to a column by said assigning means; and processing means for specifying a column identified by the displayed identification mark assigned by said assigning means and for copying the numeric data inputted by said input means in the specified column in response to depressing the element indicating the inputting or editing of data in a column is to be performed and depressing an element indicating the column to be edited or into which data is to be input.

* * * * *

UNITED STATES PATENT AND TRADEMARK OFFICE
CERTIFICATE OF CORRECTION

PATENT NO. : 5,537,525
DATED : July 16, 1996
INVENTOR(S) : SHINYA GOTOH, ET AL.

It is certified that error appears in the above-indentified patent and that said Letters Patent is hereby corrected as shown below:

Column 4

Line 19, "defining" should read --defining the--.

Column 6

Line 24, "by CPU" should read --by the CPU 1--.
Line 30, "of" should read --of RAM 2.--.

Column 8

Line 1, "in" (first occurrence) should read --is--.
Line 6, "column" should read --columns--.
Line 7, delete "present invention 2 and 3".
Line 41, "alphabetically." should read --alphabetical.--.

Signed and Sealed this

Eleventh Day of March, 1997

Attest:

BRUCE LEHMAN

Attesting Officer

Commissioner of Patents and Trademarks